United States Patent [19]
Andersen

[11] 3,940,946
[45] Mar. 2, 1976

[54] UNIVERSAL JOINT

[75] Inventor: George L. Andersen, Columbus, Ohio

[73] Assignee: General Signal Corporation, Rochester, N.Y.

[22] Filed: Oct. 2, 1974

[21] Appl. No.: 511,326

[52] U.S. Cl. .................................. 64/8; 64/7; 64/6; 403/383
[51] Int. Cl.² .......................................... F16D 3/02
[58] Field of Search ..................... 64/8, 7, 6, 23, 11; 403/383, 359

[56] References Cited
UNITED STATES PATENTS

| | | | |
|---|---|---|---|
| 1,286,945 | 12/1918 | Coates | 64/7 |
| 1,392,099 | 9/1921 | Wilson | 64/8 |
| 1,906,057 | 4/1933 | Guy | 64/11 R |
| 1,921,910 | 7/1928 | Clark | 64/6 |
| 2,956,423 | 10/1960 | Cook | 64/7 |

*Primary Examiner*—Samuel Scott
*Assistant Examiner*—Randall Heald
*Attorney, Agent, or Firm*—Harold Huberfeld; Jeffrey S. Mednick

[57] ABSTRACT

A universal joint includes a drive member and a driven member. One of the members includes a curved polyhedron and the other of the members includes a socket for receiving the curved polyhedron with an interference fit. The improvement comprises the curved polyhedron having at least two sides of different widths. A further improvement comprises a coating on the curved polyhedron which is preloaded with stored energy upon insertion of the curved polyhedron into the socket.

20 Claims, 16 Drawing Figures

UNIVERSAL JOINT

BACKGROUND OF THE INVENTION

While the invention is subject to a wide range of applications, it is especially suited for automotive steering applications and will be particularly described in that connection.

Among the problems involved in universal joint drive connections is the transmission of fluctuating angular velocity. In other words, a given rotation of the driving shaft does not necessarily result in an equal rotation of the driven shaft. Further, an increase in the angle between the driving shaft and the driven shaft causes an increase in the fluctuation of angular velocity.

Another problem found in universal joints is that clearances are required to allow the joint to rotate without binding. However, this clearance causes a backlash in the joint which is undesirable.

U.S. Pat. No. 3,406,534 to Chapper discloses a universal coupling. The patent states, for example, "The invention comprises broadly the combination of a socket firmly attached to a shaft, a ball snap-fitted into the socket, a driving rod firmly attached to the ball, a second ball in which the other end of said driving rod is longitudinally movable, a second socket engageable with the second ball, and a second shaft firmly attached to the second socket."

U.S. Pat. No. 1,906,057 to Guy discloses, for example, a "universal joint of the class in which non-metallic yieldable means is employed to transmit motion from the driving to the driven member of the joint and to permit relative angular movement for disalignment of said members."

U.S. Pat. No. 1,646,427 to Skidmore discloses, for example, "A flexible coupling for interconnecting approximately aligned shafts and comprising, a pair of coupling members adapted to be secured to the shafts, each said member having a non-circular driving face; a relatively soft elastic interconnecting element adapted to be interposed between said members and having driving faces cooperating with the driving faces of said members...." Skidmore further discloses, for example, "The side wall of the recess thus provides one or more driving faces, each of which is eccentric to the axis of rotation. One specific shape of recess which will provide the desired driving face is a hexagon."

U.S. Pat. No. 1,128,430 to Fetzer discloses, for example, "A universal joint comprising a box having a rectangular opening thereon, a shank, a head on said shank positioned within said opening, said head having rounded sides."

Universal joints are generally expensive to produce because of a need for close tolerances. Further, wear on a universal joint changes the tolerances, and tends to amplify the non-uniform velocity characteristics.

It is an object of the present invention to provide an universal joint which eliminates backlash.

It is a further object of the present invention to provide a universal joint which compensates for wear.

It is a further object of the present invention to provide a universal joint whose velocity characteristics are nearly constant.

It is a further object of the present invention to provide a universal joint that is failsafe.

It is a further object of the present invention to provide a universal joint which is relatively inexpensive to manufacture.

It is a further object of the present invention to provide a universal joint through which compressive or translational vibration cannot be transmitted.

SUMMARY OF THE INVENTION

In accordance with the present invention, there is disclosed a universal joint including a drive member and a driven member. One of the members includes a curved polyhedron and the other of the members includes a socket for receiving the curved polyhedron. The improvement comprises the curved polyhedron having at least two sides of different widths. A further improvement comprises a coating on the curved polyhedron which is preloaded with stored energy upon insertion of the curved polyhedron into the socket.

For a better understanding of the present invention, together with other and further objects thereof, reference is made to the following description, taken in connection with the accompanying drawings, while its scope will be pointed out in the appended claims.

DESCRIPTION OF THE PREFERRED EMBODIMENT

In accordance with the present invention, a universal joint 24 includes a drive member, such as steering column 30, and a driven member, such as steering shaft 28. The drive member includes a curved polyhedron, such as 52 and the driven member includes a socket, such as 40, for receiving the curved polyhedron. Polyhedron 52 has at least two sides, 106 and 108, of different widths. The polyhedron includes a coating 102 of an elastomeric material.

Figure 1:
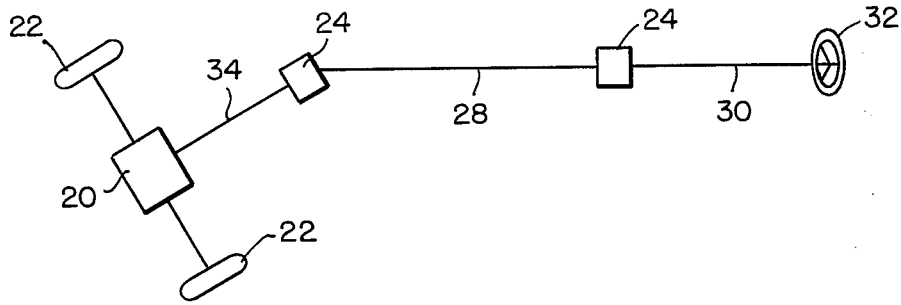
FIG. 1 is a schematic view of a steering assembly with two universal joints in accordance with the present invention.

Referring to FIG. 1, there is shown a schematic view of a steering assembly which includes two universal joints 24 according to the present invention. The steering assembly also includes wheels 22, steering box 20, steering shaft 34, common steering shaft 28, steering column 30, and steering wheel 32. When a change in the direction of wheels 22 is desired, steering wheel 32 may be rotated. This causes a rotation of steering column 30, common steering shaft 28 (including universal joints 24), and steering shaft 34. Steering box 20 may include a conventional gear assembly which is rotated by steering shaft 34. The gear assembly is also connected to wheels 22 so that rotation of the gears results in a change in the direction of wheels 22.

Figure 2:
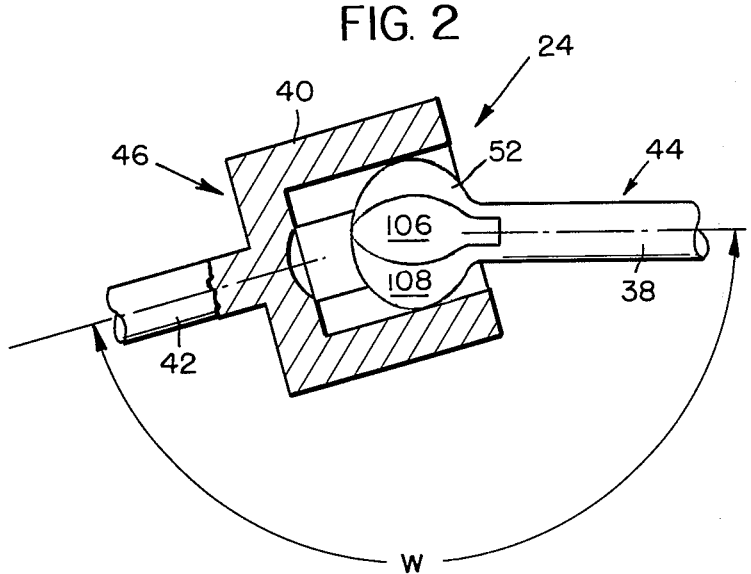
FIG. 2 is a side view, partly in section, illustrating a universal joint in accordance with the present invention.

Referring to FIG. 2, there is shown the details of universal joint 24 in accordance with the present invention. A curved polyhedron as used in the present disclosure may be defined as a mass having a plurality of curved faces. Polyhedron 52 can be basically described as the mass defined by the intersection of cylindrical segments formed on the end of drive shaft 38. It operates in tangent to the substantially planar interior sides of socket 40 on the end of driven shaft 42. Torque is transmitted through the polyhedron to socket 40 when a rotational force is applied to drive shaft 38 in either a clockwise or counter-clockwise direction. Although the polyhedron is disclosed as being on the drive member and the socket is disclosed as being on the driven member, it should be understood that the parts may be reversed so that the socket is on the drive member and the polyhedron is on the driven member.

Figure 3:
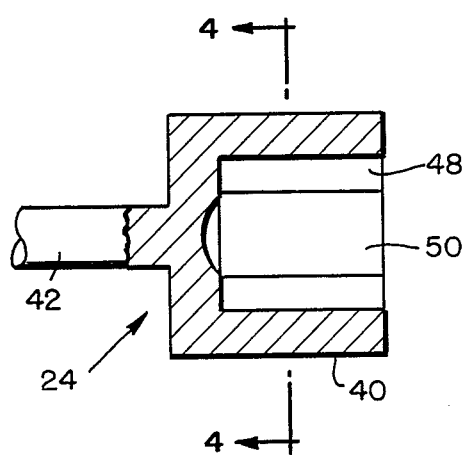
FIG. 3 is a cross-sectional view, illustrating a shaft with a socket on one end.
Figure 4:
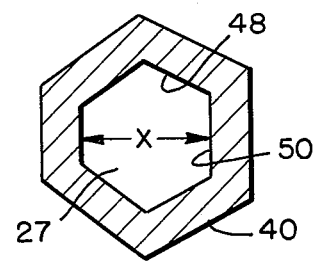
FIG. 4 is a section taken on line 4 — 4 of FIG. 3.

Socket 40, as best seen in FIGS. 3 and 4, has an interior cross-section having the shape of any desired irregular polygon. At least two interior sides, such as sides 48 and 50, have different widths. Preferably, no two sides are equal in width. The outside shape of socket 40 is a matter of engineering design, and in order to conserve material, it generally has a substantially constant wall thickness. Socket 40 has been illustrated with an interior constructed in the shape of an irregular hexagon and no two sides parallel. The depth of socket 40 should be greater than the length of curved polyhedron 52.

Figure 5:
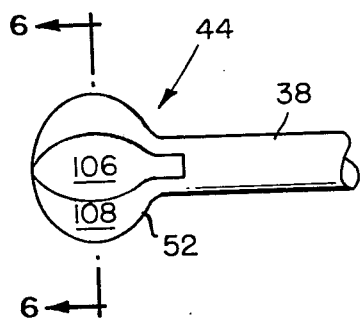
FIG. 5 is a side view, illustration a shaft with a curved polyhedron on one end.
Figure 6:
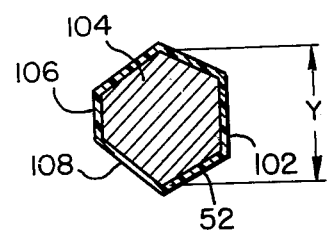
FIG. 6 is a section taken on line 6 — 6 of FIG. 5.

Referring to FIGS. 5 and 6, there is shown the details of drive member 44. Curved polyhedron 52 mates with socket 40, and therefore, its cross-section as shown in FIG. 6 is similar to the interior cross-section of socket 40 as shown in FIG. 4.

FIGS. 7 to 13 illustrate a manner in which the curved polyhedron of the present invention may be formed. While a socket 54 and polyhedron 84 will be described as having four sides to simplify the explanation, it should be understood that the concept can be expanded to fit a polyhedron with any desired number of sides. It is significant to note that any socket having an opening of irregular cross-section with substantially planar interior walls may be used in the practice of the present invention. The curved polyhedron is made to fit the socket as described below.

Figures 7, 8, 9:
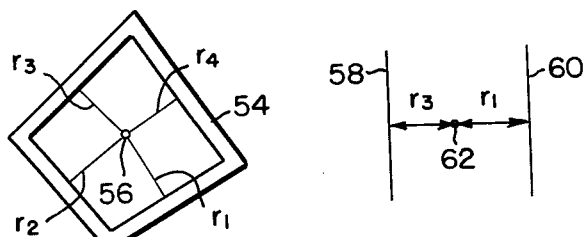
FIG. 7 is a top view of a socket having four interior sides.
FIG. 8 is a view, illustrating a step in constructing a curved polyhedron.
FIG. 9 is a view, illustrating another step in constructing a curved polyhedron.

Referring to FIG. 7, four perpendicular lines of different lengths $r_1$, $r_2$, $r_3$, and $r_4$ may be drawn from an arbitrary point 56, such as the centroid of socket 54, to each of its interior sides. The lengths of these lines are then measured. As shown in FIG. 8, two parallel lines 58 and 60 are then drawn at a distance of $r_1$ and $r_3$ from a point 62.

Referring to FIG. 9, arc segments 64 and 66 are drawn tangent to each of parallel lines 68 and 70, respectively, from point 62. Each of these arc segments are symetric about the points of tangency 72 and 74.

Figure 10:
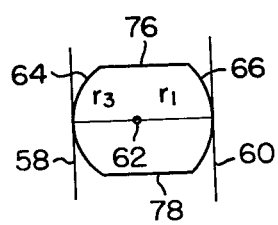
FIG. 10 is a view, illustrating another step in constructing a curved polyhedron.

Next, referring to FIG. 10, arcs 64 and 66 are connected with straight lines 76 and 78. In order to determine the length of the arcs, and therefore, the length of straight lines 76 and 78, several design considerations, such as the maximum required working angle $w$ (see FIG. 2), are considered. If the working angle $w$ is not very large, the arcs need not be very long. Also, the diameter of a shaft connected to the curved polyhedron is considered because the diameter of a shaft limits the working angle. For instance, when polyhedron 52 rotates in socket 40, (see FIG. 2) shaft 38 may be restrained by contacting the interior wall of socket 40. Therefore, the length of arc segments 64 and 66 need only be long enough to insure contact of the curved surfaces of the final polyhedron with the interior walls of the socket throughout the entire working angle $w$.

Figure 11:
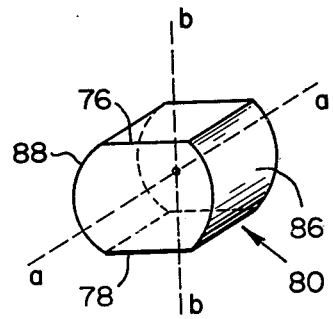
FIG. 11 is a view, illustrating another step in constructing a curved polyhedron.

Referring to FIG. 11, the two-dimensional shape shown in FIG. 10 has been expanded to a three-dimensional rod 80 having a uniform cross-section similar to the shape shown in FIG. 10. Axis $a - a$ extends along the length of rod 80 through point 62. Axis $b - b$ is perpendicular to axis $a - a$.

Figure 12:
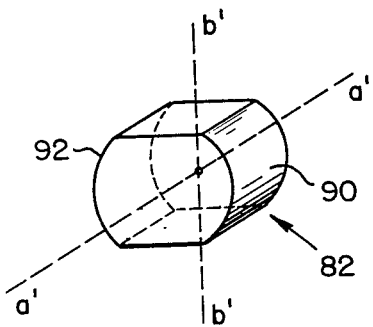
FIG. 12 is a view, illustrating another step in constructing a curved polyhedron.

FIG. 12 shows a rod 82 which is formed like rod 80 but with $r_2$ and $r_4$ being substituted for $r_1$ and $r_3$. Rod 82 has an axis $a^1 - a^1$ perpendicular to axis $b^1 - b^1$.

Figure 13:
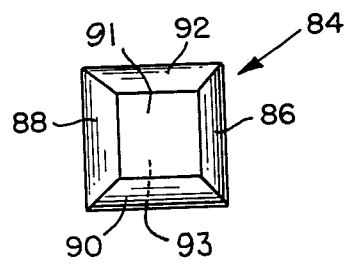
FIG. 13 is a top view, illustrating a curved polyhedron.

Referring to FIG. 13, curved polyhedron 84 consists of a combination of rods 80 and 82. It is formed as follows:

1. axis $b^1 - b^1$ of rod 82 is placed on axis $b - b$ of rod 80;
2. axis $a^1 - a^1$ of rod 82 is rotated 90° about axis $a - a$ of rod 80.

Curved polyhedron 84 is defined by curved surfaces 86, 88, 90, and 92, and the end surfaces 91 and 93. The lines of intersection between the curved surfaces have elliptical shapes.

It should be understood that this procedure is not limited to four sided polyhedrons. For example, a six-sided polyhedron could be constructed by drawing three rods (rather than two) and placing them 60° out of phase (rather than 90° out of phase).

In the manufacture of the polyhedron of the present invention, a core is made having a slightly smaller radius than defined above. This allows a coating to be applied to the core so that an interference fit between a polyhedron and a socket, according to the present invention, is accommodated.

As seen in FIG. 6, an elastomeric material 102 is coated over core 104. Material 102 may be a polyurethane such as, for example, Hytrel 6350 or Urethane 9232. The material can be applied with injection molding or made separately and stretched over core 104.

Coating 102 comprises between approximately 2 percent and 15 percent of the cross-sectional area of curved polyhedron 52. If coating 102 comprises less than approximately 2 percent of the cross-sectional area, the joint is not capable of handling any change in the working angle $w$. An interference fit between polyhedron 52 and socket 40 requires enough deformable material between the two bodies so that a change in angle $w$ does not cause polyhedron 52 to bind in socket 40. When the coating is more than approximately 15 percent of the cross-sectional area of polyhedron 52, the elastomer must have a high durometer to inhibit excessive deformation. However, with present material limitations, an elastomer with a high durometer such as, for example, above approximately 100, has a tendency to crack, rather than deform.

Since an interference fit between polyhedron 52 and socket 40 is created upon the assembly of universal joint 24, it necessarily follows that elastomeric material 102 is deformed. Wide variations in the degree of interference fit are possible, with the limitations as described below. As the deformation increases, the surface area of coating 102 which is in contact with socket 40 also increases. Further, increased deformation causes a rise in the frictional load as well as increased damping of the universal joint. if joint 24 is then operated at a high r.p.m., an increase in friction results in increased heat and possible failure of the coating. Also, at the point where polyhedron 52 transmits a turning torque to socket 40, increased deformation results in an increase in unit stress and can cause a failure of coating 102. The upper limit for the amount of deformation of material 102 is approximately 30 percent. The least amount of acceptable deformation of material 102 in universal joint 24 is enough to match or exceed the required deformation which conforms to the operating characteristics of joint 24. As the amount of deformation decreases, the joint increasingly transmits more vibration. Further, the possibilities for increasing the working angle w decreases. For example, if the working angle is 165°, an approximate 8 percent deformation of the coating 102 is required. Of course, if the joint 24 is operated so that the working angle is approximately 180° and has very small deviation such as, 1°, the amount of required deformation would be very small. In the preferred embodiment, an approximate 15 percent deformation of coating 102 provides a proper preload.

Although coating 102 is an elastomer in the preferred embodiment of the present invention, any deformable material such as, for example, spring steel, can be used. The present invention also contemplates coating the inside of a socket instead of the surface of a polyhedron.

As best seen in FIG. 2, the angle between shafts 42 and 38 is defined as the working angle w. As universal joint 24 rotates, working angle w can change as necessary. This change results in elastomer 102 taking on a new shape. Rotation of universal joint 24 without any change in working angle w also results in elastomer 102 taking on a new shape. In either case, the amount of energy stored within the elastomer remains approximately constant. When polyhedron 52 turns socket 40, the driving force is exerted on one half of a side such as, for example, 106 in FIG. 6. This results in a deformation of that portion of the side while the other half of side 106 is being expanded. Thus, the shape of the coating 102 is constantly changing while the amount of stored energy remains approximately constant.

The present invention provides a smooth, damped input-output relationship. The torsional compliance of the universal joint, which is a function of the durometer and preload of coating 102, eliminates transmission of vibration.

The preload on the elastomer has several additional advantages. Backlash is substantially eliminated because there is no free play between the polyhedron and socket. Also, as working portions of the universal joint wear, coating 102, being deformed, is still able to perform its function. Further, manufacturing tolerances do not have to be closely controlled because a small change in the interference fit does not hinder the smooth operation of the present joint.

The universal joint of the present invention has nearly constant velocity characteristics due to the preload. Many prior art universal joints transmit fluctuating angular velocity and an increase in the working angle between a drive shaft and a driven shaft causes an increase in angular fluctuation. In other words, a given rotation in a drive member does not necessarily result in the same rotation of a driven member. The angularity fluctuates through six maximums and six minimums during every 360° of joint rotation. The universal joint of the present invention, with a 30° working angle, has an angular fluctuation of plus or minus 1.5°. By comparison, a cardan joint, operating at the same working angle, fluctuates plus or minus 7°.

Additionally, the joint of the present invention is failsafe. The distance across polyhedron 52, as seen in FIG. 6, is larger than the distance across the sides of socket 40. If elastomeric material 102 fails, burns, or falls out, no slipping between the members will occur and polyhedron 52 will remain capable of turning socket 40. A second fail-safe feature resulting from the uneven sides, is a decrease in unit stress. If coating 102 fails, and curved polyhedron 52 is turned in socket 40, the edges of polyhedron 52 tend to push out the sides of socket 40. With some sides of polyhedron 52 being larger than other sides, the longer sides tend to lodge in a corner of the socket and therefore not deform the socket. On the other hand if each side of polyhedron 52 is of equal width, each edge of polyhedron 52 engages a side of socket 40 and a very high stress point is created. This can result in polyhedron 52 slipping in socket 40. It follows that joint 24 of the present invention can operate at a higher turning torque before deforming socket 40.

The present invention provides for ease in assembly when a specified orientation between the drive and driven members is required. Since several of the sides of the curved polyhedron are of different widths, the joint can only be assembled in a limited number of positions.

Figure 14:
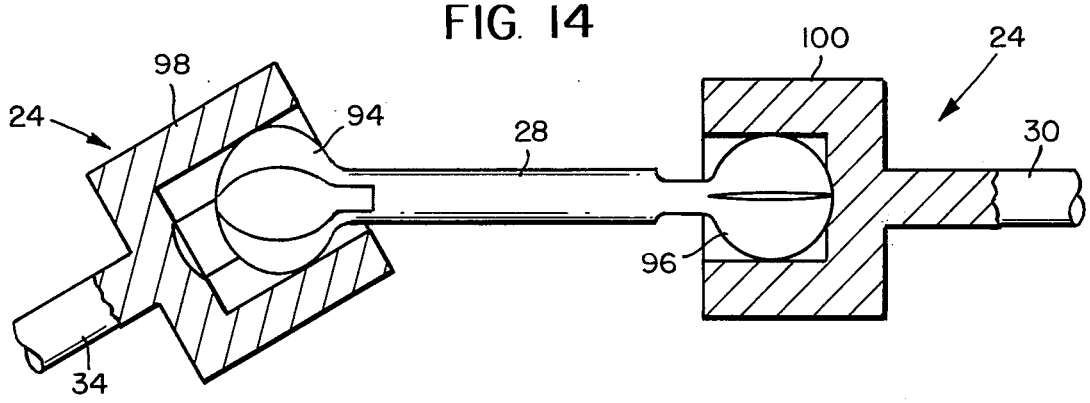
FIG. 14 is a side view, partly in section, illustrating two curved polyhedrons attached to a common shaft, and each received by a socket.

Referring to FIG. 14, a second embodiment of the present invention is shown with two universal joints 24 used in conjunction with each other. Two curved polyhedrons 94 and 96 are attached to a common shaft 28 and are out of phase from each other. By offsetting curved polyhedrons 94 and 96, any angular velocity fluctuation produced by one joint is cancelled out by the second joint. In eliminating angular velocity fluctuation, it is important to keep the working angles of the two universal joints approximately equal. The amount of offset is determined from the formula:

offset = 360/2n where n equals the number of sides of the figure. In the case of a hexagon, the polyhedrons are offset from each other by 30°. The present invention also contemplates two universal joints connected by a polyhedron and a socket on either end of a common shaft (not shown). Further, the two universal joints may be constructed with curved polyhedrons of different shapes.

Figure 15:
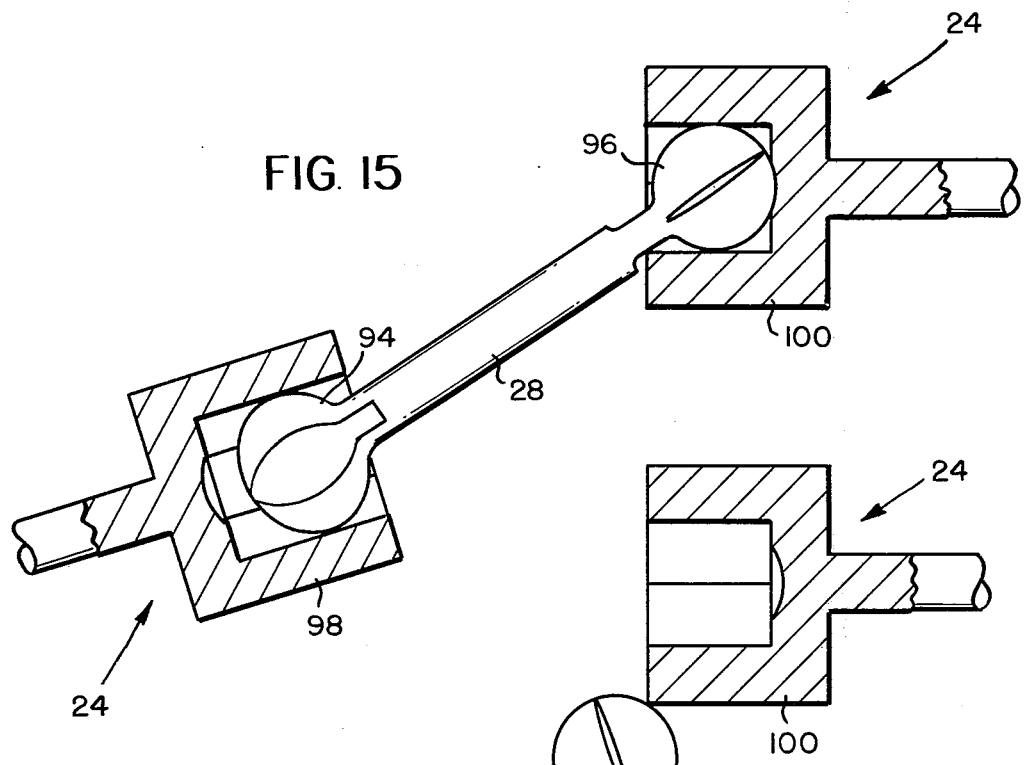
FIG. 15 is a view, in section, illustrating a pair of universal joints in a deformed steering assembly.
Figure 16:
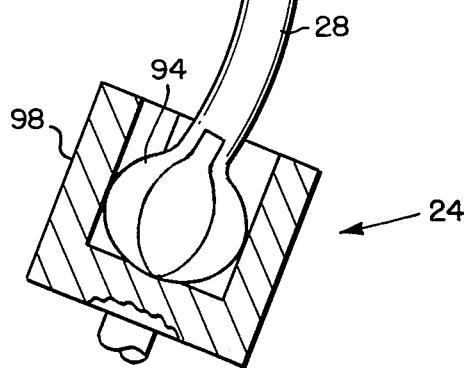
FIG. 16 is a view, partly in section, illustrating a pair of universal joints in a deformed steering assembly.

The universal joint of the present invention has several failsafe qualities which are very important in automotive steering applications. As explained hereinbefore, steering is still possible when the coating fails. If an accident occurs, and the frame may move with respect to the steering column (see FIG. 15). The deep extrusion of lower socket 98 allows lower polyhedron 94 to progress into socket 98 and therefore steering is still possible. At the same time, steering column 30 has no tendency to be driven back into the passenger compartment since the effort required to move polyhedron 96 into socket 98 is a nominal load such as, for example, less than 50 pounds. Referring to FIG. 16, further deformation of a car is assumed and upper ball 96 is shown twisted out of upper socket 100. The change in the angle of upper socket 100 in relation to common shaft 28 is due to common shaft 28 being easily bent and again a modest load is seen by the steering column. In very high impacts such as, for example, over 30 miles per hour fixed barrier collisions, there is no tendency to move steering column 30 back into the passenger compartment.

The present universal joint is relatively inexpensive to manufacture because it is formed by a cold extrusion process and does not require machining. With the exception of coating 102, the invention is manufactured from, but not limited to, metal such as, for example, 1020, 1015, or 8640 steel.

The resilient synthetic applied to the core has an additional advantage in that it provides lubricity. The present invention also contemplates putting a lubricant such as, for example, silicone grease in the joint to reduce wear.

One skilled in the art will realize that there has been disclosed a universal joint that eliminates backlash, dampens vibrations, has nearly constant velocity characteristics, is failsafe, can be efficiently made, dissipates wear, absorbs manufacturing tolerances, and has lubricity.

While there has been described what is at present considered a preferred embodiment of the invention, it will be obvious to those skilled in the art that various changes and modifications may be made therein without departing from the invention, and it is, therefore, aimed in the appended claims to cover all such changes and modifications as followed in the true spirit and scope of the invention.

What is claimed is:

1. A universal joint including a drive member and a driven member, one of said members including a curved polyhedron and the other of said members including a socket for receiving said curved polyhedron, the improvement comprising: said curved polyhedron having six sides and characterized in that said curved polyhedron is formed by intersecting cylindrical surfaces and that each of said six sides is of different width.

2. The universal joint as recited in claim 1 further characterized in that said curved polyhedron is formed by intersecting cylindrical surfaces.

3. The universal joint as recited in claim 2 further characterized in that said curved polyhedron has six sides.

4. The universal joint as recited in claim 2, further characterized in that said curved polyhedron includes a core of metal.

5. The universal joint as recited in claim 4, further characterized in that deformable means for preloading stored energy is interposed between said core of metal and said socket.

6. The universal joint as recited in claim 5, further characterized in that said deformable means comprises a coating of an elastomeric material.

7. The universal joint as recited in claim 6, further characterized in that said elastomeric material consists of approximately 2 to 15 percent of the cross-sectional area of said curved polyhedron.

8. The universal joint as recited in claim 2, further characterized in that said socket has a cavity with an interior periphery that corresponds to and is smaller than said curved polyhedron.

9. The universal joint as recited in claim 8, further characterized in that said cross-section of said cavity is greater than a corresponding cross-section of said metal core.

10. A universal joint including a drive member and a driven member, one of said members including a curved polyhedron and the other of said members including a socket for receiving said curved polyhedron, the improvement comprising: deformable means on said curved polyhedron covering substantially the entire outer surface thereof for maintaining a substantially constant preloading of stored energy throughout both a rotation and change in alignment of said universal joint.

11. The universal joint as recited in claim 10, further characterized in that said curved polyhedron includes a core of metal.

12. The universal joint as recited in claim 11, further characterized in that said deformable means consists of an elastomeric material.

13. The universal joint as recited in claim 12, further characterized in that said elastomeric material consists of approximately 2 to 15 percent of the cross-sectional area of said curved polyhedron.

14. The universal joint as recited in claim 13, further characterized in that said socket has a cavity with an interior periphery that corresponds to and is smaller than said curved polyhedron.

15. The universal joint as recited in claim 10, further characterized in that said member including a curved polyhedron has a second curved polyhedron located on an opposite end of said member from said curved polyhedron.

16. The universal joint as recited in claim 15, further characterized in that said curved polyhedron and said second curved polyhedron are substantially identical.

17. The universal joint as recited in claim 16, further characterized in that said second curved polyhedron is offset from said curved polyhedron.

18. The universal joint as recited in claim 17, further characterized in that said second curved polyhedron is received within a second socket.

19. A universal joint including a drive member and a driven member, one of said members including a curved polyhedron and the other of said members including a socket for receiving said curved polyhedron, the improvement comprising: each side of said curved polyhedron being a different width.

20. A universal joint including a drive member and a driven member, one of said members including a curved polyhedron and the other of said members including a socket for receiving said curved polyhedron, the improvement comprising: said curved polyhedron having at least three sides of different width.

* * * * *